(12) United States Patent
Sethi et al.

(10) Patent No.: US 12,547,518 B2
(45) Date of Patent: Feb. 10, 2026

(54) DEVICE PRIORITY PREDICTION USING MACHINE LEARNING

(71) Applicant: Dell Products L.P., Round Rock, TX (US)

(72) Inventors: Parminder Singh Sethi, Ludhiana (IN); Nithish Kote, Bangalore (IN); Sajit Siddalingappa Manvi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 317 days.

(21) Appl. No.: 18/118,530

(22) Filed: Mar. 7, 2023

(65) Prior Publication Data

US 2024/0303174 A1 Sep. 12, 2024

(51) Int. Cl.
*G06F 11/34* (2006.01)

(52) U.S. Cl.
CPC ...... *G06F 11/3409* (2013.01); *G06F 11/3447* (2013.01)

(58) Field of Classification Search
CPC .......... G06F 11/3409; G06F 11/3447
USPC ....................................... 702/182
See application file for complete search history.

(56) References Cited

U.S. PATENT DOCUMENTS

| 10,783,472 | B2* | 9/2020 | Carpenter | ............... H04L 43/20 |
| 11,327,545 | B2 | 5/2022 | Sethi et al. | |
| 2019/0019108 | A1* | 1/2019 | Eads | ........................ G06N 7/01 |
| 2020/0342346 | A1* | 10/2020 | Wulff | ................. H04L 41/5025 |

OTHER PUBLICATIONS

Dell Technologies, "How to Export the PERC Controller Debug Log via the BIOS RAID Controller," Article No. 000134783, https://www.dell.com/support/kbdoc/en-in/000134783/how-to-export-the-perc-controller-debug-log-via-the-bios-raid-controller, Sep. 30, 2021, 6 pages.
U.S. Appl. No. 17/982,743 filed in the name of Parminder Singh Sethi et al. on Nov. 8, 2022, and entitled "Controller Failure Prediction and Troubleshooting."

* cited by examiner

*Primary Examiner* — John H Le
(74) *Attorney, Agent, or Firm* — Ryan, Mason & Lewis, LLP

(57) ABSTRACT

A method comprises analyzing application data and performance data of a plurality of devices using one or more machine learning techniques. In the method, performance states of respective ones of the plurality of devices are determined, and priorities of applications of the respective ones of the plurality of devices is determined based at least in part on the analyzing. The method further comprises predicting a priority of the plurality of devices based at least in part on the performance states and the priorities of the applications. A report of the priority of the plurality of devices is generated.

20 Claims, 19 Drawing Sheets

| Workload | Server types | Server model | Impact List | Priority |
|---|---|---|---|---|
| SharePoint | Rack | R750 | Product Impact- Low Customer Impact - Low | 6 |
| | Modular | M630 | | |
| | Tower | T450 / T640 | | |
| Exchange | Rack | R750xd | Product Impact- Low Customer Impact - High | 1 |
| | Modular | M640 | | |
| | Tower | T450 / T640 | | |
| Backup and Recovery | Rack | R730/R740xd/R750 | Product Impact- High Customer Impact - Low | 2 |
| | Modular | Mx740, Mx840c | | |
| | Tower | T640 | | |
| HPC - High-performance Computing | Rack | Head- R840 | Product Impact- High Customer Impact - High | 4 |
| | | Edge Compute | | |
| | Modular | M630 | | |
| Virtualization | Rack | R830 / R730 / R630 | Product Impact- High Customer Impact - High | 3 |
| | Modular | M630 | | |
| | Tower | T630 | | |
| AI/ML | Racks | R750xa/R940 | Product Impact- High Customer Impact - Low | 5 |
| | Modular | Mx750C | | |

FIG. 3

```
<SystemConfiguration Model="PowerEdge R750" ServiceTag="8BCF5G3" TimeStamp="Wed Sep 29 09:05:25 2021">

<!--Export type is Normal,XML.-->

<!--Exported configuration may contain commented attributes. Attributes may be commented due to dependency, destructive nature, preserving server identity or for security reasons.-->

<!--Exported configuration does not contain InfiniBand data as the presence of the appropriate cards could not be detected!-->

<!--Exported configuration does not contain FC-HBA data as the presence of the appropriate cards could not be detected!-->
```

FIG. 4A

```xml
<Component FQDD="SupportAssist.Embedded.1">
<!-- <Attribute Name="SupportAssist.1#SupportAssistEULAAccepted"></Attribute> -->
<!-- <Attribute Name="SupportAssist.1#SupportAssistEULAAcceptedByiDRACUser"></Attribute> -->
<!-- <Attribute Name="SupportAssist.1#PrimaryContactFirstName"></Attribute> -->
<!-- <Attribute Name="SupportAssist.1#PrimaryContactLastName"></Attribute> -->
<!-- <Attribute Name="SupportAssist.1#PrimaryContactPhoneNumber"></Attribute> -->
<!-- <Attribute Name="SupportAssist.1#PrimaryContactAlternatePhoneNumber"></Attribute> -->
<!-- <Attribute Name="SupportAssist.1#PrimaryContactEmail"></Attribute> -->
<!-- <Attribute Name="SupportAssist.1#SecondaryContactFirstName"></Attribute> -->
<!-- <Attribute Name="SupportAssist.1#SecondaryContactLastName"></Attribute> -->
<!-- <Attribute Name="SupportAssist.1#SecondaryContactPhoneNumber"></Attribute> -->
<!-- <Attribute Name="SupportAssist.1#SecondaryContactAlternatePhoneNumber"></Attribute> -->
<!-- <Attribute Name="SupportAssist.1#SecondaryContactEmail"></Attribute> -->
<!-- <Attribute Name="SupportAssist.1#ShippingInfoCompanyName"></Attribute> -->
<!-- <Attribute Name="SupportAssist.1#ShippingInfoStreet1"></Attribute> -->
<!-- <Attribute Name="SupportAssist.1#ShippingInfoStreet2"></Attribute> -->
<!-- <Attribute Name="SupportAssist.1#ShippingInfoCity"></Attribute> -->
<!-- <Attribute Name="SupportAssist.1#ShippingInfoState"></Attribute> -->
<!-- <Attribute Name="SupportAssist.1#ShippingInfoCountry"></Attribute> -->
<!-- <Attribute Name="SupportAssist.1#ShippingInfoZip"></Attribute> -->
<!-- <Attribute Name="SupportAssist.1#HostOSProxyConfigured"></Attribute> -->
<!-- <Attribute Name="SupportAssist.1#HostOSProxyAddress"></Attribute> -->
<!-- <Attribute Name="SupportAssist.1#HostOSProxyPort"></Attribute> -->
<!-- <Attribute Name="SupportAssist.1#HostOSProxyUserName"></Attribute> -->
<!-- <Attribute Name="SupportAssist.1#HostOSProxyPassword"></Attribute> -->
</Component>
```

```xml
<Component FQDD="RAID.SL.7-1">
<Attribute Name="RAIDresetConfig">False</Attribute>
<Attribute Name="RAIDforeignConfig">Ignore</Attribute>
<!-- <Attribute Name="KeyID"></Attribute> -->
<Attribute Name="RAIDprMode">Automatic</Attribute>
<Attribute Name="RAIDpatrolReadUnconfiguredArea">Enabled</Attribute>
<Attribute Name="RAIDloadBalancedMode">Automatic</Attribute>
<Attribute Name="RAIDccMode">Normal</Attribute>
<Attribute Name="RAIDcopybackMode">On</Attribute>
<Attribute Name="RAIDpersistentHotspare">Disabled</Attribute>
<Attribute Name="RAIDEnhancedAutoImportForeignConfig">Disabled</Attribute>  <Attribute Name="RAIDrebuildRate">30</Attribute>
<Attribute Name="RAIDbgiRate">30</Attribute>
<Attribute Name="RAIDccRate">30</Attribute>
<Attribute Name="RAIDreconstructRate">30</Attribute>
<Component FQDD="Disk.Virtual.0:RAID.SL.7-1">
<Attribute Name="RAIDaction">Update</Attribute>
<Attribute Name="BootVD">True</Attribute>
<Attribute Name="RAIDinitOperation">None</Attribute>
<Attribute Name="DiskCachePolicy">Default</Attribute>
<!-- <Attribute Name="RAIDdefaultWritePolicy">WriteThrough</Attribute> -->
<!-- <Attribute Name="RAIDdefaultReadPolicy">NoReadAhead</Attribute> -->
<!-- <Attribute Name="Name">OS_VD</Attribute> -->
<!-- <Attribute Name="Size">399431958528</Attribute> -->
<!-- <Attribute Name="StripeSize">128</Attribute> -->
<!-- <Attribute Name="SpanDepth">1</Attribute> -->
<!-- <Attribute Name="SpanLength">2</Attribute> -->
<!-- <Attribute Name="RAIDTypes">RAID 1</Attribute> -->
<!-- <Attribute Name="IncludedPhysicalDiskID">Disk.Bay.0:Enclosure.Internal.0-1:RAID.SL.7-1</Attribute> -->
<!-- <Attribute Name="IncludedPhysicalDiskID">Disk.Bay.1:Enclosure.Internal.0-1:RAID.SL.7-1</Attribute> -->
</Component>
```

```
For Lstm
from tensorflow.keras import models, layers, preprocessing as kprocessing dtf = pd.read_csv('data.csv')
dtf.head()

format datetime column
dtf["date"] = pd.to_datetime(dtf['date'], format='%d.%m.%Y')

Split train/test from any given data point.
:parameter
    :param ts: pandas Series
    :param test: num or str - test size (ex. 0.20) or index position
        (ex. "yyyy-mm-dd", 1000)
:return
    ts_train, ts_test
```

FIG. 7A

```
Keras models
model = models.Sequential()
model.add( layers.LSTM(input_shape=(1,365), units=50,
    activation='relu', return_sequences=False) )
model.add( layers.Dense(1) )
model.compile(optimizer='adam', loss='mean_absolute_error')
"""
Preprocess a ts partitioning into X and y.
:parameter
    :param ts: pandas timeseries
    :param s: num - number of observations per seasonal (ex. 7 for weekly seasonality with daily data, 12 for yearly seasonality with monthly data)
    :param scaler: sklearn scaler object - if None is fitted
    :param exog: pandas dataframe or numpy array
:return
    X, y, scaler
"""
def utils_preprocess_ts(ts, s, scaler=None, exog=None):
    ## scale
    if scaler is None:
        scaler = preprocessing.MinMaxScaler(feature_range=(0,1))
    ts_preprocessed = scaler.fit_transform(ts.values.reshape(-1,1)).reshape(-1)

create X,y for train
    ts_preprocessed = kprocessing.sequence.TimeseriesGenerator(data=ts_preprocessed,
                                                                targets=ts_preprocessed,
                                                                length=s, batch_size=1)
    lst_X, lst_y = [], []
    for i in range(len(ts_preprocessed)):
        xi, yi = ts_preprocessed[i]
        lst_X.append(xi)
        lst_y.append(yi)
    X = np.array(lst_X)
    y = np.array(lst_y)
    return X, y, scaler
"""
```

FIG. 7B

```
Get fitted values.
"""
def utils_fitted_lstm(ts, model, scaler, exog=None):
    ## scale
    ts_preprocessed = scaler.fit_transform(ts.values.reshape(-1,1)).reshape(-1)

create Xy, predict = fitted
    s = model.input_shape[-1]
    lst_fitted = [np.nan]*s
    for i in range(len(ts_preprocessed)):
        end_ix = i + s
        if end_ix > len(ts_preprocessed)-1:
            break
        X = ts_preprocessed[i:end_ix]
        X = np.array(X)
        X = np.reshape(X, (1,1,X.shape[0]))
        fit = model.predict(X)
        fit = scaler.inverse_transform(fit)[0][0]
        lst_fitted.append(fit)
    return np.array(lst_fitted)

'''
Predict ts using previous predictions.
'''
def utils_predict_lstm(ts, model, scaler, pred_ahead, exog=None):
    ## scale
    s = model.input_shape[-1]
    ts_preprocessed = list(scaler.fit_transform(ts[-s:].values.reshape(-1,1)))

predict, append, re-predict
    lst_preds = []
    for i in range(pred_ahead):
        X = np.array(ts_preprocessed[len(ts_preprocessed)-s:])
        X = np.reshape(X, (1,1,X.shape[0]))
        pred = model.predict(X)
        ts_preprocessed.append(pred)
        pred = scaler.inverse_transform(pred)[0][0]
        lst_preds.append(pred)
    return np.array(lst_preds)
```

```
function Get-Tasklist
{
    Begin
    {
        [string[]]$result = ""
    }
    Process
    {
        "ProcessName" + " " + "Priority" > ProcsAndPrios.txt
        #foreach ($c in $ComputerName) {
        $c = "Host"
        Write-Verbose -Message "checking $c"
        $result = tasklist /v /s "$c"
        if (!$?){
            # Better error handling can happen here.
            Write-Warning 'Tasklist failed.'
            throw
        }
        Write-Warning 'Tasklist Passed.'
        # Parsing the formatting based on the tasklist output
        $format = $result[2] | ConvertFrom-String | measure -Property * -Character | select property, characters
        foreach ($r in $result){
            if ($r.length -eq 0){
                Write-Verbose 'Hitting a blank line'
                continue
            }
            if ($r -match "^(===)+" -or $r -match "^Image\sName\s+PID"){
                Write-Verbose 'Hitting the headers'
                continue
            }
            else{
                Write-Verbose -Message "checking $r"
                [int]$StringPosition = 0
                [int]$FieldCount = 0
```

FIG. 9A

```
$ImageName = ($r.Substring($StringPosition,$format[$FieldCount].characters)).Trim()
    $StringPosition = $StringPosition + $format[$FieldCount].characters + 1
    $FieldCount = $FieldCount +1

$ProcessID = ($r.Substring($StringPosition,$format[$FieldCount].characters)).Trim()
    $StringPosition = $StringPosition + $format[$FieldCount].characters +1
    $FieldCount = $FieldCount +1

$SessionName = ($r.Substring($StringPosition,$format[$FieldCount].characters)).Trim()
    $StringPosition = $StringPosition + $format[$FieldCount].characters +1
    $FieldCount = $FieldCount +1

$Session = ($r.Substring($StringPosition,$format[$FieldCount].characters)).Trim()
    $StringPosition = $StringPosition + $format[$FieldCount].characters+1
    $FieldCount = $FieldCount +1

$MemUsage = ($r.Substring($StringPosition,$format[$FieldCount].characters)).Trim()
    $StringPosition = $StringPosition + $format[$FieldCount].characters+1
    $FieldCount = $FieldCount +1

$Status = ($r.Substring($StringPosition,$format[$FieldCount].characters)).Trim()
    $StringPosition = $StringPosition + $format[$FieldCount].characters +1
    $FieldCount = $FieldCount +1

$UserName = ($r.Substring($StringPosition,$format[$FieldCount].characters)).Trim()
    $StringPosition = $StringPosition + $format[$FieldCount].characters+1
    $FieldCount = $FieldCount +1

$CPUTime = ($r.Substring($StringPosition,$format[$FieldCount].characters)).Trim()
    $StringPosition = $StringPosition + $format[$FieldCount].characters+1
    $FieldCount = $FieldCount +1
```

```
$prop = [ordered]@{
    'ComputerName' = $c
    'ImageName' = $ImageName
    'PID' = $ProcessID
    #'SessionName' = $SessionName
    'Session#' = $Session
    'MemUsage' = $MemUsage
    'Status' = $Status
    'UserName' = $UserName
    'CPUTime' = $CPUTime
    #'WindowTitle' = $WindowTitle
} #End of $prop block $prog = Get-Process -Id $ProcessID $ProcOutput = $prog.ProcessName + " " + $prog.PriorityClass.ToString()
$ProcOutput >> ProcsAndPrios.txt } #End of else block
    } #End of foreach block of result text parsing
#} #End of foreach block for computers
} #End of process block End
{
}
} #End of function Write-Host "Before calling Function."
Get-Tasklist
```

| Server | Application/Service on the Host ||| Host H/W Utilization |||
| | Application 1 | Application 2 | Application 3 | CPU | Memory | Power |
| --- | --- | --- | --- | --- | --- | --- |
| 1 | SQL Database | Web Service | Backup Agent Service | 80% | 60% | 70% |
| 2 | Banking Software | Web Service | File Server | 40% | 50% | 50% |
| 3 | SQL IMDB | Backup Agent Service | Web Service | 30% | 50% | 55% |
| 4 | Big data analytics | Backup Agent Service | | 86% | 70% | 90% |
| 5 | SQL IMDB | File service | Backup Agent Service | 60% | 80% | 60% |
| 6 | HPCG | | | 40% | 50% | 50% |

FIG. 10

DEVICE PRIORITY PREDICTION USING MACHINE LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to prioritization and management of datacenter devices.

BACKGROUND

Datacenters may include, for example, thousands of interconnected computing devices capable of hosting a large number of applications. The computing devices may malfunction and reach critical states where the devices are non-operational or close to failure. The critical states may be due to, for example, hardware errors and/or lack of available compute resources. Multiple computing devices may be in a critical state at a given time, with each requiring attention and action to resolve the device issues. Given the large scale of modern datacenter designs, there is a challenge in determining which computing devices should have priority when addressing device issues and failures.

SUMMARY

Illustrative embodiments provide techniques for automated prioritization and management of devices when addressing device issues and/or failures.

In one embodiment, a method comprises analyzing application data and performance data of a plurality of devices using one or more machine learning techniques. In the method, performance states of respective ones of the plurality of devices are determined, and priorities of applications of the respective ones of the plurality of devices is determined based at least in part on the analyzing. The method further comprises predicting a priority of the plurality of devices based at least in part on the performance states and the priorities of the applications. A report of the priority of the plurality of devices is generated.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 3 depicts a table including details of workloads for different servers and their corresponding impact and priorities according to an illustrative embodiment.

FIGS. 4A, 4B and 4C depict portions of a server configuration profile (SCP) file from a remote-access controller according to an illustrative embodiment.

FIGS. 7A, 7B and 7C depict example pseudocode for using a long short-term memory (LSTM) machine learning algorithm to determine device performance states in an illustrative embodiment.

FIGS. 9A, 9B and 9C depict example pseudocode for collection of data corresponding to utilization of computers in a datacenter in an illustrative embodiment.

FIG. 10 depicts a table including details of server applications and workloads according to an illustrative embodiment.

DETAILED DESCRIPTION

Figure 1:
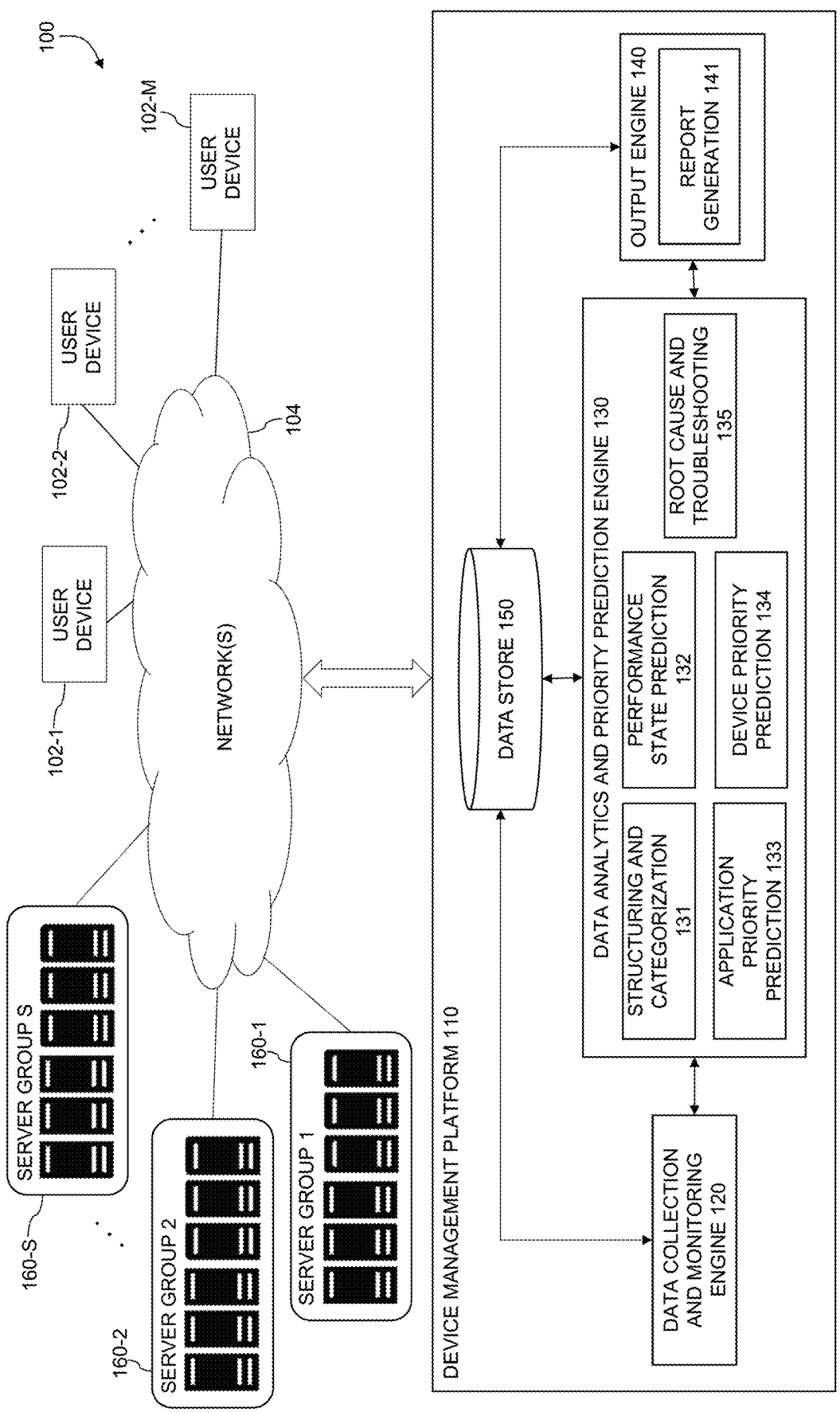
FIG. 1 depicts details of an information processing system with a device management platform for prioritizing and managing devices when addressing device issues and/or failures according to an illustrative embodiment.

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

As used herein, a "computing device" refers to a device configured to provide functionality (e.g., applications, tasks and services) for programs or other devices. A non-limiting example of a computing device is a server. Computing devices provide various functionalities for clients or users, including, but not necessarily limited to, hosting web pages, cataloging network data, storing data, implementing communications, performing computations, sharing files, processing electronic mail, providing gaming services, providing streaming services and providing virtualization services.

In illustrative embodiments, machine learning techniques are used to intelligently prioritize and manage a plurality of computing devices (also referred to herein as "devices") in various situations such as for example, when one or more of the plurality of devices are experiencing operational issues, failure or other critical states where the one or more devices may fail to function or their ability to function may be impeded. The embodiments advantageously provide for automated prioritization of devices for monitoring, remediation and workload assignments when multiple devices are experiencing critical states.

According to one or more embodiments, machine learning techniques are used to prioritize servers and/or other devices in a datacenter by analyzing, for example, applications installed on the servers, system load, system traffic and system health information. A recommended component priority list for a datacenter is transmitted to a datacenter administrator, who will have authority to apply or modify the recommendations. Machine learning models predict usage of critical applications on a real-time basis and allocate resources (e.g., hardware resources) to the critical applications on a timely basis with less downtime than current approaches. A decision tree model (e.g., random forest) narrows the priority list for dynamically added devices.

A time series model continuously monitors real-time performance data to prioritize computing devices of a plurality of computing devices (e.g., server farm), and dynamically modify a priority list based on continuous learning.

FIG. 1 shows an information processing system 100 configured in accordance with an illustrative embodiment. The information processing system 100 comprises user devices 102-1, 102-2, . . . 102-M (collectively "user devices 102"). The user devices 102 communicate over a network 104 with a device management platform 110.

The user devices 102 can comprise, for example, Internet of Things (IoT) devices, desktop, laptop or tablet computers, mobile telephones, or other types of processing devices capable of communicating with the device management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. The variable M and other similar index variables herein such as K, L, N and S are assumed to be arbitrary positive integers greater than or equal to one.

The terms "client" or "user" herein are intended to be broadly construed so as to encompass numerous arrangements of human, hardware, software or firmware entities, as well as combinations of such entities. Power distribution management services may be provided for users utilizing one or more machine learning models, although it is to be appreciated that other types of infrastructure arrangements could be used. At least a portion of the available services and functionalities provided by the device management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the device management platform 110, as well as to support communication between the device management platform 110 and connected devices (e.g., user devices 102) and/or other related systems and devices not explicitly shown.

In some embodiments, the user devices 102 are assumed to be associated with repair technicians, system administrators, information technology (IT) managers, software developers release management personnel or other authorized personnel configured to access and utilize the device management platform 110.

The information processing system 100 further includes server groups 160-1, 160-2, . . . , 160-S (collectively "server groups 160") connected to the device management platform 110 and/or to each other via the network 104 or other type of connection such as, for example, a wired connection. Although the embodiments are explained in terms of server groups 160, the embodiments are not necessarily limited thereto, and may apply to other types of devices such as, but not necessarily limited to, storage arrays, controllers, etc.

The device management platform 110 in the present embodiment is assumed to be accessible to the user devices 102 and vice versa over the network 104. In addition, the device management platform 110 can access the server groups 160 and vice versa over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The device management platform 110, on behalf of respective infrastructure tenants each corresponding to one or more users associated with respective ones of the user devices 102 provides a platform for automating the prioritization and management of devices (e.g., servers in the server groups 160) when addressing device issues and/or failures.

Referring to FIG. 1, the device management platform 110 comprises a data collection and monitoring engine 120, a data analytics and priority prediction engine 130, an output engine 140 and a data store 150. The data analytics and priority prediction engine 130 comprises a structuring and categorization layer 131, a performance state prediction layer 132, an application priority prediction layer 133, a device priority prediction layer 134 and a root cause and troubleshooting layer 135. The output engine 140 comprises a report generation layer 141.

Figure 2:
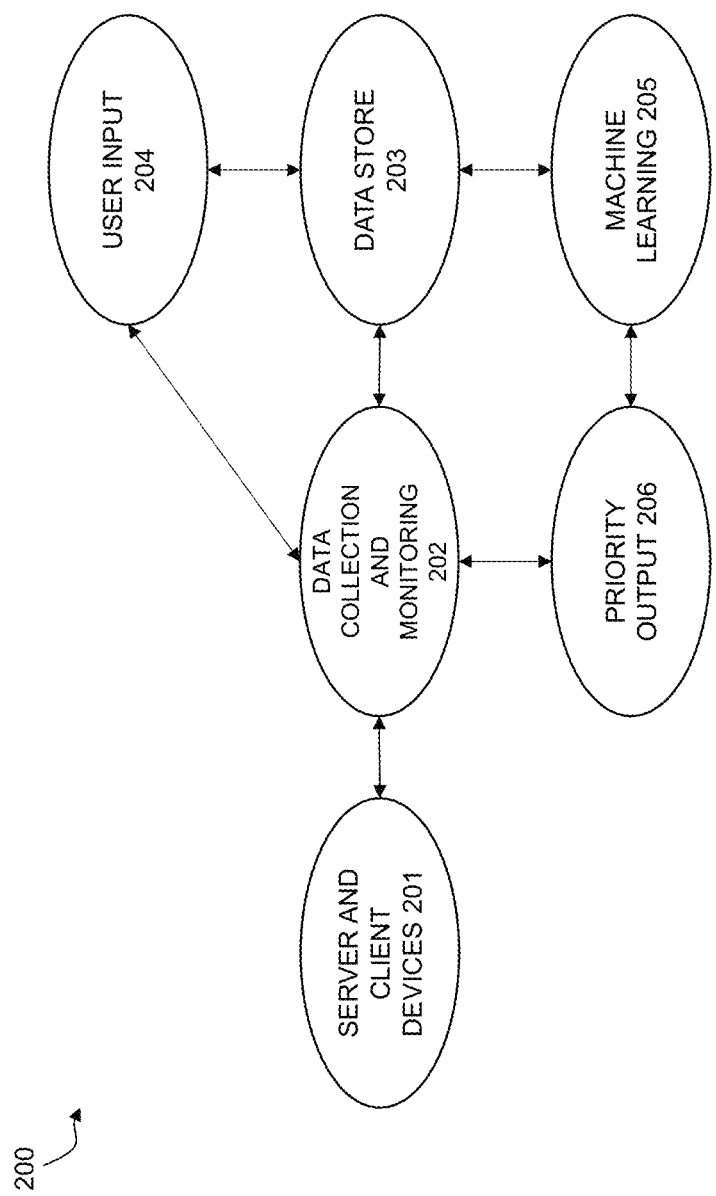
FIG. 2 depicts an operational flow for device prioritization and management according to an illustrative embodiment.

The data collection and monitoring engine 120 collects data corresponding to the operation, performance, programs, applications, tasks and/or services of servers in the server groups 160 and/or one or more of the user devices 102, which may be client devices. The devices of a datacenter, for example, may comprise the servers in the server groups 160 and one or more of the user devices 102. The data can be collected using one or more data collection applications such as, but not necessarily limited to, SupportAssist Enterprise available from Dell Technologies. The data collection and monitoring engine 120 collects the data, for example, by tracking service requests, through scheduled collections at designated times and/or through event-based collections. For example, when service requests for repair or other issues corresponding to given ones of the servers in the server groups 160 or to given ones of the user devices 102 are initiated, the data collection and monitoring engine 120 processes the service requests and collects operational data associated with the subject server or user device 102 and/or components identified in the service request. Scheduled collections occur at pre-defined times or intervals specified by, for example, an administrative user via one or more user devices 102 or automatically scheduled by the data collection and monitoring engine 120. Event-based collections are triggered by one or more events such as, but necessarily limited to, component failure, a detected degradation of performance of a component, installation of new software or firmware, the occurrence of certain operations, etc. In some embodiments, an integrated Dell® remote access controller (iDRAC) causes the data collection and monitoring engine 120 to collect data from one or more servers in the server groups 160 and/or user devices 102 and export the collected data to a location (e.g., data store 150) on the device management platform 110 or to a shared network location (e.g., centralized database). As can be seen in blocks 201, 202 and 203 in the operational flow 200 in FIG. 2, according to an illustrative embodiment, data from server and client devices is collected by the data collection and monitoring engine and stored in a data store. In some embodiments, in connection with the event-based collections, the data collection and monitoring engine 120 evaluates the health of servers and/or user devices 102 for changes in performance metrics (e.g., decreases in input-output operations per second (IOPS) and throughput, increases in latency, etc.) to eliminate downtime before it occurs. Data may be automatically collected by the data collection and monitoring engine 120 responsive to one or more service requests and/or events, and through scheduled collections.

Figure 5:
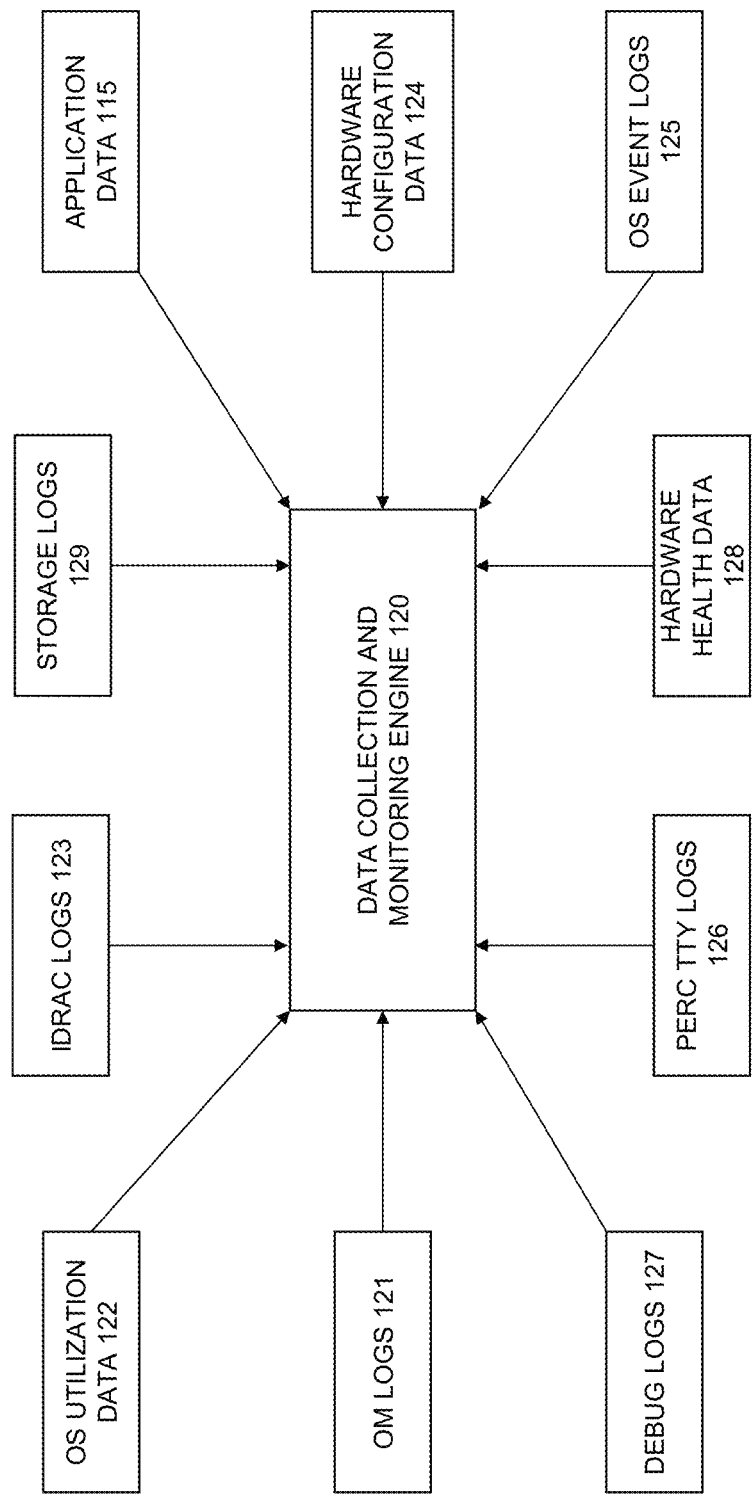
FIG. 5 depicts different types of data collected by a data collection and monitoring engine in an illustrative embodiment.

Referring to FIG. 5, the data collected by the data collection and monitoring engine 120 includes, but is not necessarily limited to, application data 115, device Open-Manage (OM) logs 121, operating system (OS) utilization data 122, device iDRAC logs 123, hardware configuration data 124, OS event logs 125, PowerEdge™ RAID Controller (PERC TTY) logs 126, debug logs 127, hardware health data 128 and storage logs 129.

The application data 115 includes, for example, an identification of which applications are installed on respective ones of the servers of the server group 160 and/or user devices 102, an identification of which of the applications are running on the respective ones of the servers of the server group 160 and/or user devices 102, and/or an identification of which of the applications have been designated as critical.

For example, application data 115 comprises data corresponding to installed applications on a server or other processing device, including data identifying all of the services and tasks which are running in the system components and data identifying created datasets in the system components. According to an embodiment, applications are identified based on task. In the ultimate priority determination made by the device priority prediction layer 134 as described in more detail herein, higher priority may be assigned to devices running more applications, services and tasks, and having more datasets than other devices.

Designated criticality data includes, for example, user-defined application, job and/or task criticality for applications, jobs and/or tasks being executed or to be executed by one or more of the servers in the server groups 160 and/or user devices 102. As can be seen in block 204 in the operational flow 200 in FIG. 2, user input comprising designated criticality data can be inputted to the data store directly and/or via the data collection and monitoring engine 120. A user, such as an administrator (via one or more user devices 102) may input a pre-defined application priority list to the device management platform 110 specifying the priority of certain applications or services over other applications or services based on, for example, need. In the ultimate priority determination made by the device priority prediction layer 134 as described in more detail herein, servers or other devices running the higher priority applications, tasks and/or services are given higher priority than servers or other devices not running the higher priority applications, tasks and/or services.

An example of the application data is illustrated in the table 300 in FIG. 3. The table 300 includes details of workloads for different servers. As explained in more detail herein, the machine learning techniques are used to predict priorities associated with different servers and their workloads, as well as the product and/or customer impact from failure of the server. For example, the failure of some workloads and corresponding servers may be predicted to have low product and/or customer impacts, while the failure of other workloads and corresponding servers may be predicted to have high product and/or customer impacts. The predictions may be based, at least in part, on usage patterns of the servers and applications associated with the workloads, giving the highest priority to applications with higher usage and/or applications crucial to other operations. The embodiments automatically allocate compute resources to the servers determined to have higher priority over the servers determined to have lower priority.

The data collection and monitoring engine 120 collects live and historical data, which includes, for example, system information, storage logs, OS and application data, basic input-output system (BIOS) serial logs and debug logs. The BIOS serial logs can be collected using secure shell (SSH) protocol.

Some example log entries include reference to, for example, an error-correcting code (ECC), controller reset, aborted operations, failure of a highly available sync pool, a triggered watchdog, crashes, failure of background initialization (BGI), a corrupted consistency check (CC), request time outs, network bounces, etc. Other example log entries, which may be related to failure, specify, for example, out of memory, network table full-dropping packet, call traces, unsupported bits, etc. Some of the references may be extracted from error messages.

In illustrative embodiments, the data collected by the data collection and monitoring engine 120 includes performance data comprising, for example, utilization data (e.g., OS utilization data 122), log data (e.g., from logs 121, 123, 125, 126, 127 and 129), device error data, device health data (e.g., hardware health data 128) and device configuration data (e.g., hardware configuration data 124). The utilization data comprises, for example, central processing unit (CPU) utilization, memory utilization, network utilization and storage utilization of the servers of the server group 160 and/or user devices 102. In more detail, the utilization data includes, but it is not necessarily limited to, hardware capacity and availability data comprising, for example, memory usage and available free memory of the system hardware components. Utilization data may identify incoming and outgoing input-output (IO) operation network or CPU processing traffic that a system and/or individual devices such as, for example, servers are handling. In accordance with an embodiment, in the ultimate priority determination made by the device priority prediction layer 134 as described in more detail herein, higher priority is assigned to devices reflecting higher traffic and load than other devices. Higher priority is also assigned to components reflecting higher memory usage and less available free memory than other components. FIGS. 9A, 9B and 9C depict example pseudocode 901, 902 and 903 for collection of data corresponding to utilization of computers in a datacenter. The pseudocode 901, 902 and 903 includes, for example, commands for retrieving task lists, computer names, process names and process priority.

Hardware health data 128 comprises, for example, data regarding whether there have been any critical hardware failures, and/or any indications in, for example, collected logs whether components have been or are in critical states. In accordance with an embodiment, in the ultimate priority determination made by the device priority prediction layer 134 as described in more detail herein, higher priority is assigned to components reflecting worse health than other components.

In one or more embodiments, the device configuration data is received from a remote-access controller (e.g., iDRAC) in a server configuration profile (SCP) file. FIGS. 4A, 4B and 4C depict portions 401, 402 and 403 of an SCP file from an iDRAC. SCP files are exported from one or more iDRACs, which include device information. In one or more embodiments, the data collection and monitoring engine 120 comprises a centralized log collector (CLC) which collects and stores the SCP files and logs from one or more iDRACs. The logs may comprise live and historical logs relating to differences in severity of events (e.g., informational, warning and critical).

The data collected from the data collection and monitoring engine 120 is stored in the data store 150 and is input to the data analytics and priority prediction engine 130. The data, which includes real-time data, is collected and monitored periodically for decision making and maintains information about the servers of the server group 160 and/or user devices 102 in a centralized location (e.g., data store 150). The data store 150 improves decision-making, problem-solving and triaging of data.

In illustrative embodiments, the data collected by the data collection and monitoring engine 120 may comprise unstructured data, which is structured and categorized by the structuring and categorization layer 131. In a non-limiting illustrative example, the structuring and categorization layer 131 uses a decision tree algorithm to categorize issues in the collected data. The structuring and categorization layer 131 further utilizes image analysis, natural language processing (NLP) and/or natural language understanding (NLU) techniques to categorize the data. In more detail, since logs comprise textual data, NLP and/or NLU techniques are used to identify key terms and/or phrases in the logged entries. In some embodiments, text and semantics are extracted from a log image. In order to parse through unstructured text, the embodiments utilize a combination of a mask region-based convolutional neural network (Mask-R-CNN) algorithm with optical character recognition (OCR), which accomplishes object detection, text object segmentation and text extraction for an image.

According to one or more embodiments, the data analytics and priority prediction engine 130 uses machine learning techniques to analyze system components (e.g., a plurality of servers across a datacenter) to prioritize them in an order of importance from most important to least important based on the data collected by the data collection and monitoring engine 120 (e.g., performance and application data).

According to one or more embodiments, the data collected by the data collection and monitoring engine 120 comprises historical and real-time datasets reflecting performance data concurrent with or nearly concurrent with its collection. The data collection and monitoring engine continuously monitors the servers of the server group 160 and the user devices 102 to continuously retrieve and update performance states and application priority.

The performance state prediction layer 132, application priority prediction layer 133 and device priority prediction layer use machine learning techniques to analyze the performance and application data and generates the priority list of devices (e.g., servers) based on the analysis. Referring to the operational flow 600 in FIG. 6, in an illustrative embodiment for operation of the performance state prediction layer 132, data from the data store 650 including, for example, real-time utilization data 680 of the devices (e.g., servers of the server groups 160 and user devices 102), is applied to a time series model, such as, an LSTM model 632, to yield real-time device performance states 682 of respective ones of the devices. The real-time utilization data 680 comprises, for example, CPU utilization, memory utilization, network utilization and storage utilization of the plurality of devices. FIGS. 7A, 7B and 7C depict example pseudocode 701, 702 and 703 for using an LSTM machine learning algorithm to determine device performance states.

Data from the data store 650 including, for example, application data of the devices (e.g., server 1 661-1, server 2 661-2, ..., server N 661-N (collectively "servers 661"), is applied to one or more regression models to analyze the application data to yield priorities of applications 684 of the respective ones of the plurality of devices running on the servers 661. According to an embodiment, the regression model comprises a random forest decision tree model 633. Decision trees 662-1, 662-2, . . . , 662-N (collectively "decision trees 662") are generated corresponding to the servers 661-1, 661-2, . . . 661-N, respectively. In illustrative embodiments, one or more devices (e.g., servers) may be added to, for example, a datacenter at any given time. In this case, additional decision trees are dynamically generated and added to the random forest decision tree model 633 to correspond to the added one or more devices. The application data is analyzed using the additional decision trees and the original plurality of decision trees. Alternatively, if devices are removed from the datacenter, the corresponding decision trees are removed from the random forest decision tree model 633.

Figure 6:
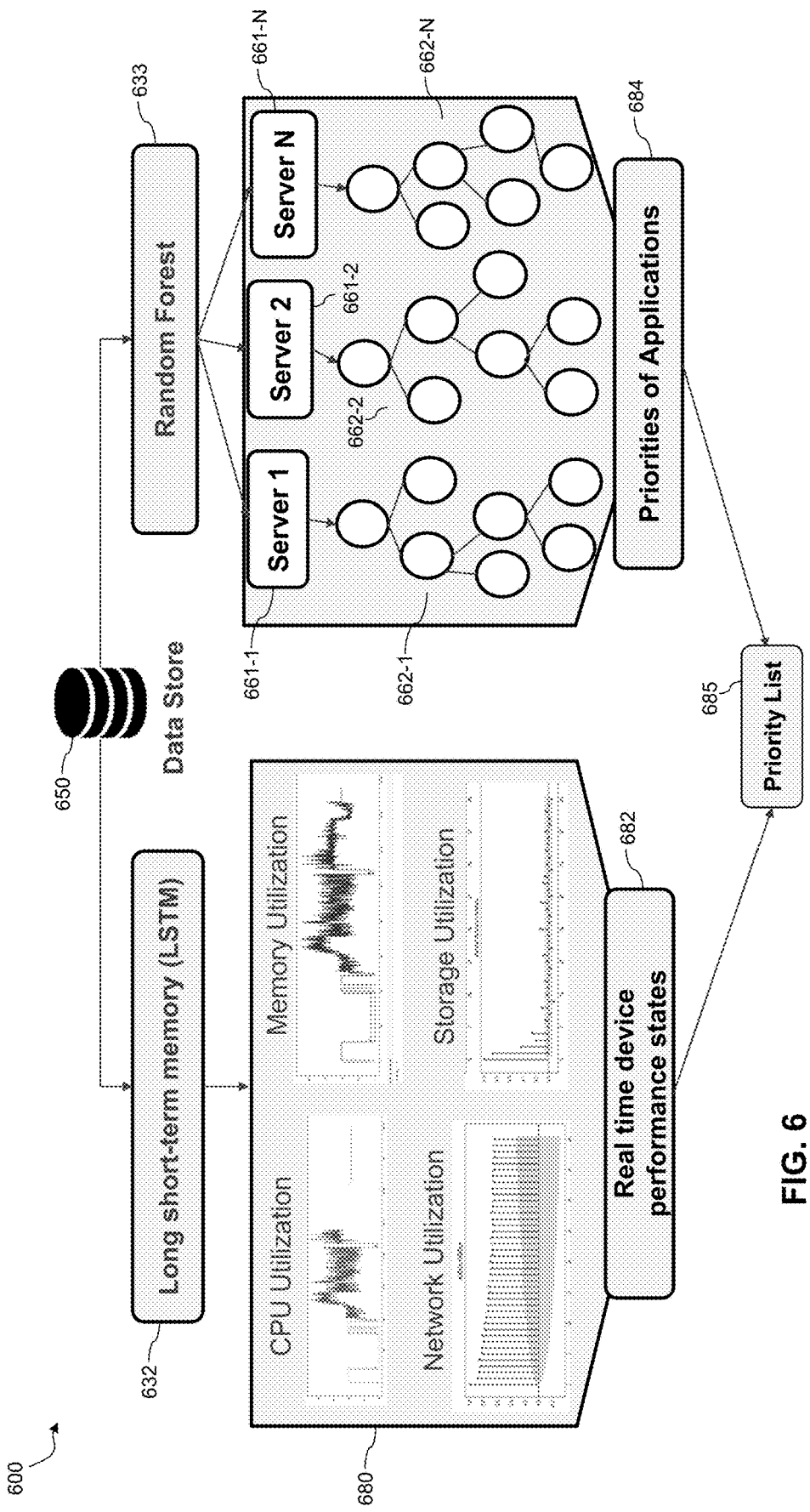
FIG. 6 depicts details of a machine learning algorithm for determining device priority in an illustrative embodiment.

As shown in FIG. 6, the real-time device performance states 682 and the priorities of applications 684 are analyzed by the device priority prediction layer 134 using the priority metrics discussed hereinabove to generate the priority list 685 of the devices (e.g., servers 661). As can be seen in blocks 205 and 206 in the operational flow 200 in FIG. 2, based on data from the data store, the machine learning models are used to generate the priority output. In some embodiments, the priority output is used by the data collection and monitoring engine 120 to prioritize or increase frequency of monitoring for those devices having higher priorities.

According to an embodiment, a user (e.g., an administrator via one of the user devices 102) can modify the priority list 685 or determine to use the priority list as generated. In one or more embodiments, remedial steps to address device issues and/or failures are automatically performed on the devices in an order corresponding to the priority list. Such remedial measures can include, for example, automatic reallocation of compute resources (e.g., hardware and software resources) to the devices that are higher on the priority list and/or automatic troubleshooting of device issues (e.g., downloading and installing new software or firmware versions, performing network tests and/or modifications, etc.) in a device order based on the priority list 685.

The data collection and monitoring engine 120 continuously monitors and collects device performance data, which is applied to a time series model, such as the LSTM model, to analyze the data to generate the real-time device performance states 682. The data collection and monitoring engine 120 continuously monitors and collects application data, which is applied to a regression model such as, for example, a decision tree (e.g., random forest) regression model, to analyze the data to generate the priorities of applications 684. Based upon the real-time performance states 682 and priorities of applications 684, the priority list 685 of devices can be dynamically generated and modified by continuously learning. A report generation layer 141 of the output engine 140 generates a report comprising the priority list 685, and causes transmission of the report to one or more user devices 102 over network 104.

Referring to the table 1000 in FIG. 10, an example dataset that may be captured by the data collection and monitoring engine 120 includes one or more applications/services that each server is providing, and percentages of real-time CPU, memory and power utilization for each server in the list.

In determining the performance states of the respective ones of the plurality of devices (e.g., servers of the server groups 160), the performance state prediction layer 132 and the root cause and troubleshooting layer 135 identify one or more issues with one or more of the plurality of devices. The root cause and troubleshooting layer 135 uses one or more machine learning techniques to determine one or more causes of the one or more issues, and the report generation layer 141 includes the one or more issues, the one or more causes of the one or more issues and one or more troubleshooting options in the report including the priority list of the plurality of devices that is transmitted to one or more user devices 102. One or more embodiments provide comprehensive insight into the root cause of issues and an interface through which users can perform troubleshooting of issues based on provided checklists and instructions including recommended corrective actions.

Figure 8:
FIG. 8 depicts an example listing of collected data corresponding to utilization of computers in a datacenter in an illustrative embodiment.

FIG. 8 depicts an example listing 800 of collected data corresponding to utilization of computers in a datacenter. The example listing 800 specifies computer name, image name, process identifier (PID), session number, memory usage, status, user name, CPU time and priority. The PID comprises a unique number identifying a running process in an OS. The priority specifies the priority of the device determined by the device priority prediction layer 134.

According to one or more embodiments, the data store 150/650 or any other databases used by the device management platform 110 to store, for example, data collected by the data collection and monitoring engine 120, can be configured according to a relational database management system (RDBMS) (e.g., PostgreSQL). Databases in some embodiments are implemented using one or more storage systems or devices associated with the device management platform 110. In some embodiments, one or more of the storage systems utilized to implement the databases comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the device management platform 110, the data collection and monitoring engine 120, data analytics and priority prediction engine 130, output engine 140 and/or data store 150 in other embodiments can be implemented at least in part externally to the device management platform 110, for example, as stand-alone servers, sets of servers or other types of systems coupled to the network 104. For example, the data collection and monitoring engine 120, data analytics and priority prediction engine 130, output engine 140 and/or data store 150 may be provided as cloud services accessible by the device management platform 110.

The data collection and monitoring engine 120, data analytics and priority prediction engine 130, output engine 140 and/or data store 150 in the FIG. 1 embodiment are each assumed to be implemented using at least one processing device. Each such processing device generally comprises at least one processor and an associated memory, and implements one or more functional modules for controlling certain features of the data collection and monitoring engine 120, data analytics and priority prediction engine 130, output engine 140 and/or data store 150.

At least portions of the device management platform 110 and the components thereof may be implemented at least in part in the form of software that is stored in memory and executed by a processor. The device management platform 110 and the components thereof comprise further hardware and software required for running the device management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the data collection and monitoring engine 120, data analytics and priority prediction engine 130, output engine 140, data store 150 and other components of the device management platform 110 in the present embodiment are shown as part of the device management platform 110, at least a portion of the data collection and monitoring engine 120, data analytics and priority prediction engine 130, output engine 140, data store 150 and other components of the device management platform 110 in other embodiments may be implemented on one or more other processing platforms that are accessible to the device management platform 110 over one or more networks. Such components can each be implemented at least in part within another system element or at least in part utilizing one or more stand-alone components coupled to the network 104.

It is assumed that the device management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the data collection and monitoring engine 120, data analytics and priority prediction engine 130, output engine 140, data store 150 and other components of the device management platform 110, and the elements thereof can each be implemented in the form of one or more LXCs running on one or more VMs. Other arrangements of one or more processing devices of a processing platform can be used to implement the data collection and monitoring engine 120, data analytics and priority prediction engine 130, output engine 140 and data store 150, as well as other components of the device management platform 110. Other portions of the system 100 can similarly be implemented using one or more processing devices of at least one processing platform.

Distributed implementations of the system 100 are possible, in which certain components of the system reside in one datacenter in a first geographic location while other components of the system reside in one or more other data centers in one or more other geographic locations that are potentially remote from the first geographic location. Thus, it is possible in some implementations of the system 100 for different portions of the device management platform 110 to reside in different data centers. Numerous other distributed implementations of the device management platform 110 are possible.

Accordingly, one or each of the data collection and monitoring engine 120, data analytics and priority prediction engine 130, output engine 140, data store 150 and other components of the device management platform 110 can each be implemented in a distributed manner so as to comprise a plurality of distributed components implemented on respective ones of a plurality of compute nodes of the device management platform 110.

It is to be appreciated that these and other features of illustrative embodiments are presented by way of example only, and should not be construed as limiting in any way.

Accordingly, different numbers, types and arrangements of system components such as the data collection and monitoring engine 120, data analytics and priority prediction engine 130, output engine 140, data store 150 and other components of the device management platform 110, and the elements thereof can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments, functionality for the device management platform can be offered to cloud infrastructure customers or other users as part of FaaS, CaaS and/or PaaS offerings.

Figure 11:
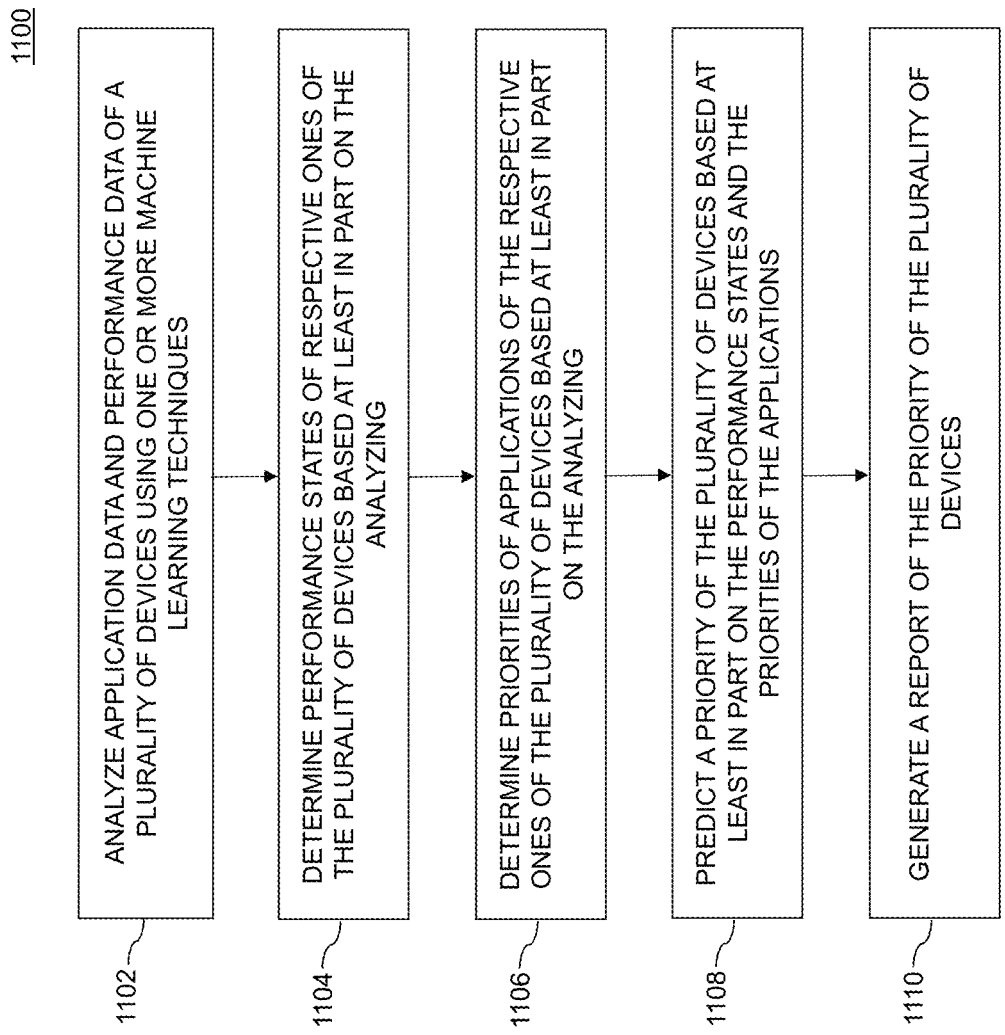
FIG. 11 depicts a process for prioritizing and managing devices according to an illustrative embodiment.

The operation of the information processing system 100 will now be described in further detail with reference to the flow diagram of FIG. 11. With reference to FIG. 11, a process 1100 for prioritizing and managing devices as shown includes steps 1102 through 1110, and is suitable for use in the system 100 but is more generally applicable to other types of information processing systems comprising a device management platform configured for prioritizing and managing devices.

In step 1102, application data and performance data of a plurality of devices are analyzed using one or more machine learning techniques. In step 1104, performance states of respective ones of the plurality of devices are determined based at least in part on the analyzing. In step 1106, priorities of applications of the respective ones of the plurality of devices are determined based at least in part on the analyzing. In step 1108, a priority of the plurality of devices is predicted based at least in part on the performance states and the priorities of the applications. In step 1110, a report of the priority of the plurality of devices is generated. The plurality of devices may comprise, for example, a plurality of servers The application data comprises, for example, an identification of which of the applications are installed on the respective ones of the plurality of devices, an identification of which of the applications are running on the respective ones of the plurality of devices and/or an identification of which of the applications have been designated as critical. The performance data comprises device utilization data, device log data, device error data, device health data and/or device configuration data. The device utilization data comprises CPU utilization, memory utilization, network utilization and/or storage utilization of the plurality of devices. The device configuration data may be received from a remote-access controller in an SCP file.

In illustrative embodiments, the one or more machine learning techniques comprise a time series model, wherein determining the performance states comprises using the time series model to analyze the performance data to determine real-time performance states of the respective ones of the plurality of devices. The time series model may comprise an LSTM model.

The one or more machine learning techniques also comprise a decision tree model comprising a plurality of decision trees respectively corresponding to the respective ones of the plurality of devices, wherein determining the priorities of the applications comprises using the decision tree model to analyze the application data to determine the priorities of the applications. The decision tree model may comprise a random forest model.

In one or more embodiments, when one or more devices are added to the plurality of devices, one or more decision trees in addition to the plurality of decision trees are dynamically generated to correspond to the added one or more devices, and the application data is analyzed using the one or more decision trees in addition to the plurality of decision trees.

Determining the performance states of the respective ones of the plurality of devices may comprise identifying one or more issues with one or more of the plurality of devices. One or more machine learning techniques may be used to determine one or more causes of the one or more issues, and the one or more issues and the one or more causes of the one or more issues may be included in the report of the priority of the plurality of devices.

It is to be appreciated that the FIG. 11 process and other features and functionality described above can be adapted for use with other types of information systems configured to execute device management services in a device management platform or other type of platform.

The particular processing operations and other system functionality described in conjunction with the flow diagram of FIG. 11 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 11 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a device management platform as disclosed herein can provide a number of significant advantages relative to conventional arrangements. For example, unlike conventional techniques, the embodiments advantageously use machine learning techniques to automate prioritization and management of devices in, for example, a datacenter when faced with device issues and/or failures. The embodiments provide functionality for ascertaining device priority based on device application data and real-time performance data and automating remedial operations, allocation of hardware resources and/or device monitoring based on the determined priority. Current approaches require administrators to manually identify essential/priority servers in response to failures and/or device issues. For example, in a server farm, with thousands of running applications, there are currently no techniques to determine device priority for addressing failures and/or for allocation of available resources. The embodiments provide technical solutions which automate the priority determination based on, for example, critical workloads and device performance, which reduces device downtime.

Advantageously, the embodiments use time series and decision tree techniques to automatically prioritize devices by analyzing installed applications, load, traffic and health information of the devices. In addition, the embodiments dynamically update priorities when devices are added to or removed from a datacenter or a cluster of devices.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system components such as the device management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a device management platform in illustrative embodiments. These and other cloud-based systems in illustrative embodiments can include object stores.

Illustrative embodiments of processing platforms will now be described in greater detail with reference to FIGS. 12 and 13. Although described in the context of system 100, these platforms may also be used to implement at least portions of other information processing systems in other embodiments.

Figure 12:
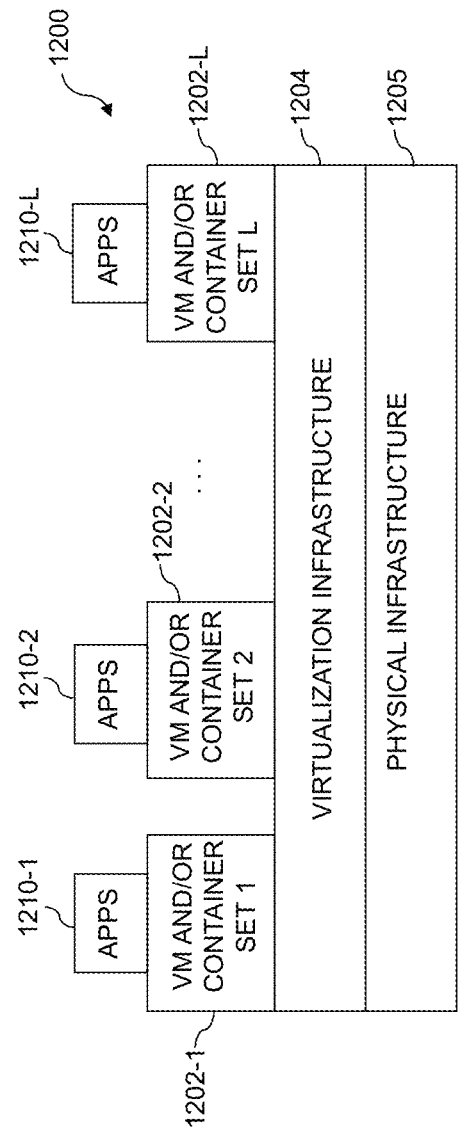
FIGS. 12 and 13 show examples of processing platforms that may be utilized to implement at least a portion of an information processing system in illustrative embodiments.
Figure 13:
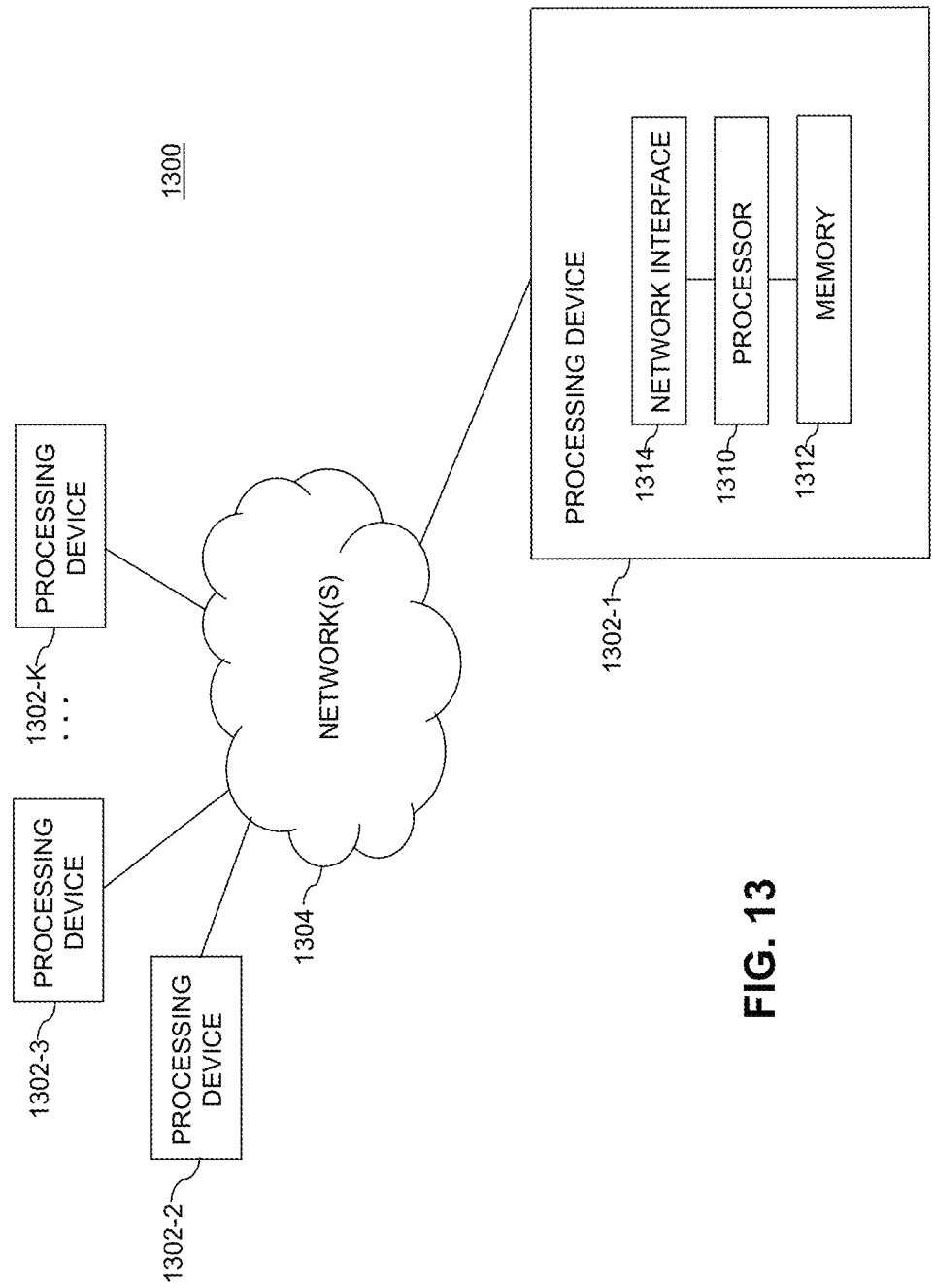

FIG. 12 shows an example processing platform comprising cloud infrastructure 1200. The cloud infrastructure 1200 comprises a combination of physical and virtual processing resources that may be utilized to implement at least a portion of the information processing system 100. The cloud infrastructure 1200 comprises multiple virtual machines (VMs) and/or container sets 1202-1, 1202-2, . . . 1202-L implemented using virtualization infrastructure 1204. The virtualization infrastructure 1204 runs on physical infrastructure 1205, and illustratively comprises one or more hypervisors and/or operating system level virtualization infrastructure. The operating system level virtualization infrastructure illustratively comprises kernel control groups of a Linux operating system or other type of operating system.

The cloud infrastructure 1200 further comprises sets of applications 1210-1, 1210-2, . . . 1210-L running on respective ones of the VMs/container sets 1202-1, 1202-2, . . . 1202-L under the control of the virtualization infrastructure 1204. The VMs/container sets 1202 may comprise respective VMs, respective sets of one or more containers, or respective sets of one or more containers running in VMs.

In some implementations of the FIG. 12 embodiment, the VMs/container sets 1202 comprise respective VMs implemented using virtualization infrastructure 1204 that comprises at least one hypervisor. A hypervisor platform may be used to implement a hypervisor within the virtualization infrastructure 1204, where the hypervisor platform has an associated virtual infrastructure management system. The underlying physical machines may comprise one or more distributed processing platforms that include one or more storage systems.

In other implementations of the FIG. 12 embodiment, the VMs/container sets 1202 comprise respective containers implemented using virtualization infrastructure 1204 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1200 shown in FIG. 12 may represent at least a portion of one processing platform. Another example of such a processing platform is processing platform 1300 shown in FIG. 13.

The processing platform 1300 in this embodiment comprises a portion of system 100 and includes a plurality of processing devices, denoted 1302-1, 1302-2, 1302-3, . . . 1302-K, which communicate with one another over a network 1304.

The network 1304 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1302-1 in the processing platform 1300 comprises a processor 1310 coupled to a memory 1312. The processor 1310 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1312 may comprise random access memory (RAM), read-only memory (ROM), flash memory or other types of memory, in any combination. The memory 1312 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1302-1 is network interface circuitry 1314, which is used to interface the processing device with the network 1304 and other system components, and may comprise conventional transceivers.

The other processing devices 1302 of the processing platform 1300 are assumed to be configured in a manner similar to that shown for processing device 1302-1 in the figure.

Again, the particular processing platform 1300 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more components of the device management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and device management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining application data and performance data of a plurality of devices, the application data comprising an identification of which applications associated with the plurality of devices have been designated as having a given level of criticality;
structuring and categorizing the application data and the performance data of the plurality of devices using a first machine learning model, the categorizing including categorizing one or more issues in the application data and the performance data using one or more machine learning algorithms of the first machine learning model;
analyzing application data and performance data of a plurality of devices using a second machine learning model to determine performance states of respective ones of the plurality of devices based at least in part on the analysis of the second machine learning model;
analyzing application data and performance data of a plurality of devices using a third machine learning model to determine priorities of applications of the respective ones of the plurality of devices based at least in part on the analysis of the third machine learning model;
predicting a priority of the plurality of devices based at least in part on performance states output by the second machine learning model and priorities of the applications output by the third machine learning model;
analyzing application data and performance data of a plurality of devices using a fourth machine learning model to determine one or more causes of the one or more issues; and
generating a report of the priority of the plurality of devices, the report further comprising the one or more issues and the one or more causes of the one or more issues associated with each of the plurality of devices;
wherein the method is executed by a processing device operatively coupled to a memory.

2. The method of claim 1, wherein the application data comprises at least one of an identification of which of the applications are installed on the respective ones of the plurality of devices and an identification of which of the applications are running on the respective ones of the plurality of devices.

3. The method of claim 1, wherein the second machine learning model comprises a time series model, and wherein determining the performance states comprises using the time series model to analyze the performance data to determine real-time performance states of the respective ones of the plurality of devices.

4. The method of claim 3, wherein the time series model comprises a long short-term memory model.

5. The method of claim 1, wherein the performance data comprises at least one of device utilization data, device log data, device error data, device health data and device configuration data.

6. The method of claim 5, wherein the device utilization data comprises at least one of central processing unit utilization, memory utilization, network utilization and storage utilization of the plurality of devices.

7. The method of claim 5, further comprising receiving the device configuration data from a remote-access controller in a server configuration profile file.

8. The method of claim 1, wherein the plurality of devices comprise a plurality of servers.

9. The method of claim 1, wherein the third machine learning model comprises a decision tree model comprising a plurality of decision trees respectively corresponding to the respective ones of the plurality of devices, and wherein determining the priorities of the applications comprises using the decision tree model to analyze the application data to determine the priorities of the applications.

10. The method of claim 9, wherein the decision tree model comprises a random forest model.

11. The method of claim 9, wherein one or more devices are added to the plurality of devices, and the method further comprises:
dynamically generating one or more decision trees in addition to the plurality of decision trees to correspond to the added one or more devices; and
analyzing the application data using the one or more decision trees in addition to the plurality of decision trees.

12. The method of claim 1, wherein determining the performance states of the respective ones of the plurality of devices comprises identifying the one or more issues associated with one or more of the plurality of devices.

13. An apparatus comprising:
a processing device operatively coupled to a memory and configured to:
obtain application data and performance data of a plurality of devices, the application data comprising an identification of which applications associated with the plurality of devices have been designated as having a given level of criticality;
structure and categorize the application data and the performance data of the plurality of devices using a first machine learning model, the categorizing including categorizing one or more issues in the application data and the performance data using one or more machine learning algorithms of the first machine learning model;
analyze application data and performance data of a plurality of devices using a second machine learning model to determine performance states of respective ones of the plurality of devices based at least in part on the analysis of the second machine learning model;
analyze application data and performance data of a plurality of devices using a third machine learning model to determine priorities of applications of the respective ones of the plurality of devices based at least in part on the analysis of the third machine learning model;
predict a priority of the plurality of devices based at least in part on performance states output by the second machine learning model and priorities of the applications output by the third machine learning model;
analyze application data and performance data of a plurality of devices using a fourth machine learning model to determine one or more causes of the one or more issues; and
generate a report of the priority of the plurality of devices, the report further comprising the one or more issues and the one or more causes of the one or more issues associated with each of the plurality of devices.

14. The apparatus of claim 13, wherein the second machine learning model comprises a time series model, and wherein, in determining the respective performance states, the processing device is configured to use the time series model to analyze the performance data to determine real-time performance states of the respective ones of the plurality of devices.

15. The apparatus of claim 13, wherein the third machine learning model comprises a decision tree model comprising a plurality of decision trees respectively corresponding to the respective ones of the plurality of devices, and wherein, in determining the priorities of the applications, the processing device is configured to use the decision tree model to analyze the application data to determine the priorities of the applications.

16. The apparatus of claim 15, wherein one or more devices are added to the plurality of devices, and the processing device is further configured to:
   dynamically generate one or more decision trees in addition to the plurality of decision trees to correspond to the added one or more devices; and
   analyze the application data using the one or more decision trees in addition to the plurality of decision trees.

17. The apparatus of claim 13, wherein the performance data comprises at least one of device utilization data, device log data, device error data, device health data and device configuration data.

18. An article of manufacture comprising a non-transitory processor-readable storage medium having stored therein program code of one or more software programs, wherein the program code when executed by at least one processing device causes said at least one processing device to perform the steps of:
   obtaining application data and performance data of a plurality of devices, the application data comprising an identification of which of applications associated with the plurality of devices have been designated as having a given level of criticality;
   structuring and categorizing the application data and the performance data of the plurality of devices using a first machine learning model, the categorizing including categorizing one or more issues in the application data and the performance data using one or more machine learning algorithms of the first machine learning model;
   analyzing application data and performance data of a plurality of devices using a second machine learning model to determine performance states of respective ones of the plurality of devices based at least in part on the analysis of the second machine learning model;
   analyzing application data and performance data of a plurality of devices using a third machine learning model to determine priorities of applications of the respective ones of the plurality of devices based at least in part on the analysis of the third machine learning model;
   predicting a priority of the plurality of devices based at least in part on performance states output by the second machine learning model and priorities of the applications output by the third machine learning model;
   analyzing application data and performance data of a plurality of devices using a fourth machine learning model to determine one or more causes of the one or more issues; and
   generating a report of the priority of the plurality of devices, the report further comprising the one or more issues and the one or more causes of the one or more issues associated with each of the plurality of devices.

19. The article of manufacture of claim 18, wherein the second machine learning model comprises a time series model, and wherein, in determining the respective performance states, the program code causes said at least one processing device to perform the step of using the time series model to analyze the performance data to determine real-time performance states of the respective ones of the plurality of devices.

20. The article of manufacture of claim 18, wherein the third machine learning model comprises a decision tree model comprising a plurality of decision trees respectively corresponding to the respective ones of the plurality of devices, and wherein, in determining the priorities of the applications, the program code causes said at least one processing device to perform the step of using the decision tree model to analyze the application data to determine the priorities of the applications.

* * * * *